(12) United States Patent
McLain

(10) Patent No.: US 9,636,817 B2
(45) Date of Patent: May 2, 2017

(54) OUTDOOR MULTI-USE HAND TOOL

(71) Applicant: DJS Enterprises, Hartland, WI (US)

(72) Inventor: Scott S. McLain, Mukwonago, WI (US)

(73) Assignee: D.J.S. Enterprises, Inc., Oconomowoc, WI (US)

( * ) Notice: Subject to any disclaimer, the term of this patent is extended or adjusted under 35 U.S.C. 154(b) by 68 days.

(21) Appl. No.: 14/449,539

(22) Filed: Aug. 1, 2014

(65) Prior Publication Data

US 2015/0034391 A1 Feb. 5, 2015

Related U.S. Application Data

(60) Provisional application No. 61/861,741, filed on Aug. 2, 2013, provisional application No. 61/915,201, filed on Dec. 12, 2013.

(51) Int. Cl.
*A01B 33/02* (2006.01)
*B25F 5/00* (2006.01)
*A46B 13/02* (2006.01)

(52) U.S. Cl.
CPC .............. *B25F 5/00* (2013.01); *A01B 33/024* (2013.01); *A01B 33/028* (2013.01); *A46B 13/02* (2013.01)

(58) Field of Classification Search
CPC ....................... B25F 5/00; A46B 13/02; A01D 42/00–42/08; A01B 33/00–33/16; A01B 1/06–1/065; A01B 15/16; A01B 9/00–9/006; A01B 1/00–1/246; A01B 23/06; A01B 35/28; A01B 37/00

See application file for complete search history.

(56) References Cited

U.S. PATENT DOCUMENTS

| | | | | |
|---|---|---|---|---|
| RE19,242 E | * | 7/1934 | Miller | A01B 33/10 172/549 |
| 2,366,626 A | * | 1/1945 | Cadwallader | A01B 33/082 172/51 |
| 2,749,563 A | * | 6/1956 | Resser, Sr. | A46B 13/00 15/102 |
| 2,823,597 A | * | 2/1958 | Cadwallader | A01B 33/027 172/103 |
| 2,847,924 A | * | 8/1958 | Quick | A01B 33/12 172/123 |
| 2,907,395 A | * | 10/1959 | Moe | A01B 1/065 172/125 |
| 3,031,018 A | * | 4/1962 | Smithers | A01B 33/027 172/122 |

(Continued)

*Primary Examiner* — Robert Pezzuto
*Assistant Examiner* — Adam Behrens
(74) *Attorney, Agent, or Firm* — Boyle Fredrickson, S.C.

(57) ABSTRACT

A powered hand tool is adapted to use a variety of interchangeable rotary tools to assist in outdoor activities. Either of two basic tool designs can be utilized for activities including garden tilling, brushing and cleaning, auguring or post hole digging, and auto finishing and polishing. In one embodiment, an adjustable shroud is utilized along with a tiller construction to change the viewing angle of the working tiller tines to facilitate use by operators of different heights, including a kneeling position. The ability to utilize tow torque and low speed assists in avoiding accidental damage to underground wires and, if encountered, the reversibility of the drive assists in untangling the wires.

12 Claims, 9 Drawing Sheets

(56) References Cited

U.S. PATENT DOCUMENTS

| | | | | |
|---|---|---|---|---|
| 3,042,434 | A * | 7/1962 | Heiniger | A01B 1/065 172/41 |
| 3,129,771 | A * | 4/1964 | Lidstone | A01B 1/065 172/111 |
| 3,444,934 | A * | 5/1969 | Alberto | A01B 1/16 172/25 |
| 3,597,883 | A * | 8/1971 | Choplin | B24B 23/02 451/358 |
| 3,793,782 | A * | 2/1974 | Bowling | B24B 23/02 15/23 |
| 4,049,059 | A * | 9/1977 | Weibling | A01G 3/062 172/15 |
| 4,079,787 | A * | 3/1978 | Prat | A01B 33/082 172/123 |
| 4,099,576 | A * | 7/1978 | Jilani | A01B 23/06 172/555 |
| 4,213,504 | A * | 7/1980 | Schneider | A01B 1/065 172/25 |
| 4,250,968 | A * | 2/1981 | Fox | A01C 5/064 172/555 |
| 4,354,564 | A * | 10/1982 | Watanabe | A01B 33/028 172/103 |
| 4,386,661 | A * | 6/1983 | McCanse | A01B 33/12 172/103 |
| 4,421,176 | A * | 12/1983 | Tuggle | A01B 33/027 172/112 |
| 4,469,184 | A * | 9/1984 | Simpson | A01B 1/065 172/41 |
| 5,048,616 | A * | 9/1991 | Hoff | A01B 33/028 172/120 |
| 5,048,617 | A * | 9/1991 | Haven | A01B 33/027 172/116 |
| 5,056,605 | A * | 10/1991 | Bond | A01B 1/065 172/111 |
| 5,287,934 | A * | 2/1994 | Porter | A01B 33/16 172/120 |
| D349,021 | S * | 7/1994 | Gutknecht | A01B 33/16 D8/1 |
| 5,850,882 | A * | 12/1998 | Link | A01B 1/065 172/112 |
| 5,960,889 | A * | 10/1999 | McLaren | A01B 1/065 172/123 |
| 6,006,434 | A * | 12/1999 | Templeton | A01D 34/90 30/276 |
| 6,041,463 | A * | 3/2000 | Stauch | A46B 13/02 15/182 |
| 6,955,227 | B1 * | 10/2005 | Motosko | A01B 1/065 172/111 |
| D518,491 | S * | 4/2006 | Vaughn | A01B 33/16 D15/28 |
| D651,054 | S * | 12/2011 | Alex | A01B 33/16 D8/8 |
| 8,162,072 | B2 * | 4/2012 | Marcil | A01B 33/028 172/125 |
| 8,434,563 | B2 * | 5/2013 | Gendelman | A01B 33/028 172/107 |
| 8,627,897 | B2 * | 1/2014 | Marcil | A01B 33/082 172/42 |
| 2003/0066663 | A1 * | 4/2003 | McKill | A01B 1/065 172/41 |
| 2003/0079455 | A1 * | 5/2003 | Suchdev | A01B 1/065 56/16.9 |
| 2003/0102138 | A1 * | 6/2003 | Firdaus | A01B 33/103 172/518 |
| 2003/0132012 | A1 * | 7/2003 | Nagaoka | A01B 33/028 172/42 |
| 2004/0007368 | A1 * | 1/2004 | Sugimoto | A01B 33/082 172/42 |
| 2004/0149466 | A1 * | 8/2004 | Stark | A01B 33/028 172/518 |
| 2007/0131436 | A1 * | 6/2007 | Asay | A01B 1/065 172/41 |
| 2010/0139936 | A1 * | 6/2010 | Notaras | A01B 33/028 172/42 |
| 2010/0230123 | A1 * | 9/2010 | Ortiz | A01B 1/00 172/41 |
| 2011/0209886 | A1 * | 9/2011 | Gendelman | A01B 33/028 172/112 |
| 2011/0303425 | A1 * | 12/2011 | Marcil | A01B 33/082 172/43 |
| 2012/0189372 | A1 * | 7/2012 | Burnett | A46B 11/066 401/282 |
| 2013/0212815 | A1 * | 8/2013 | Kempf | A46B 13/02 15/22.1 |

* cited by examiner

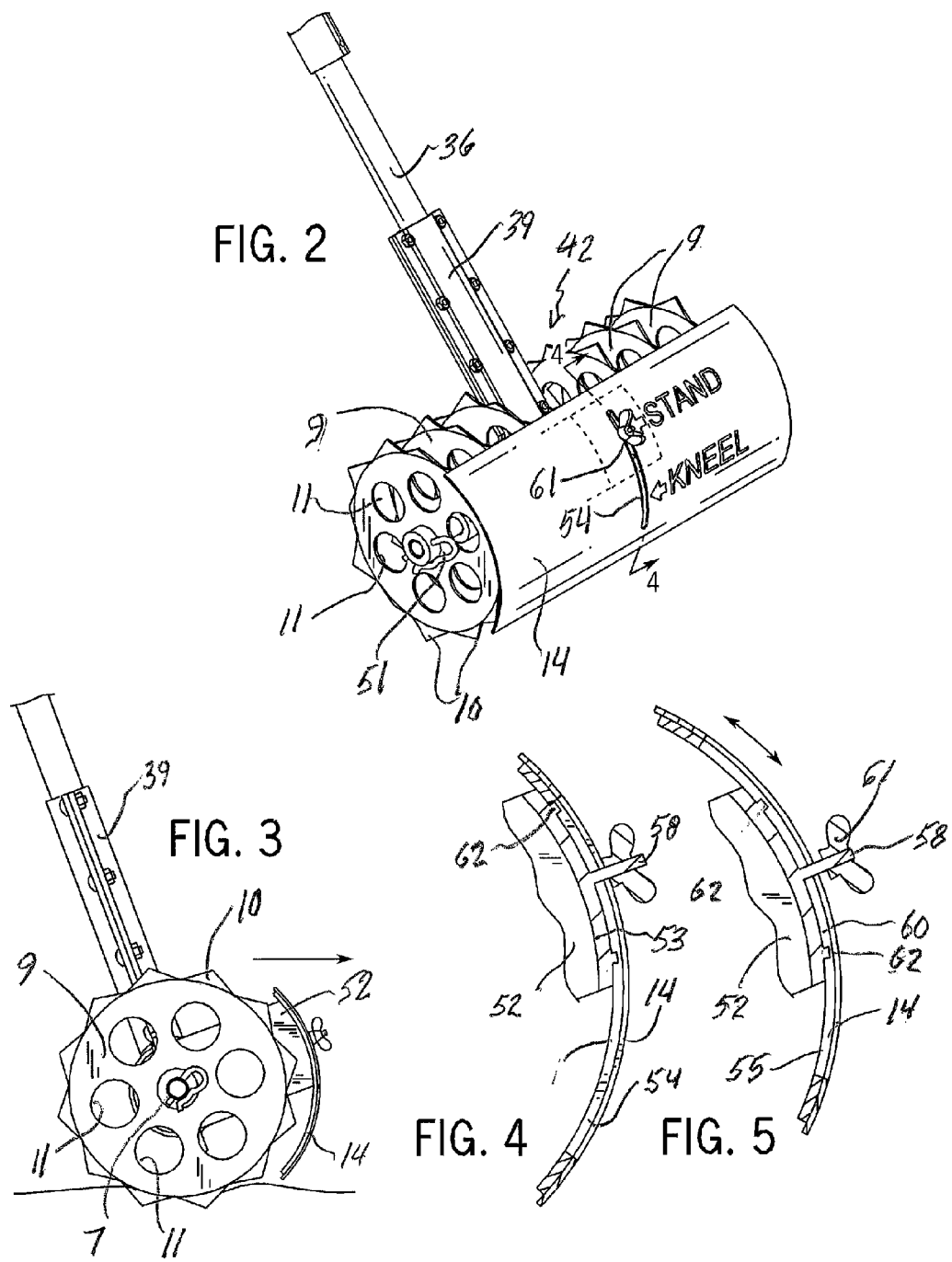

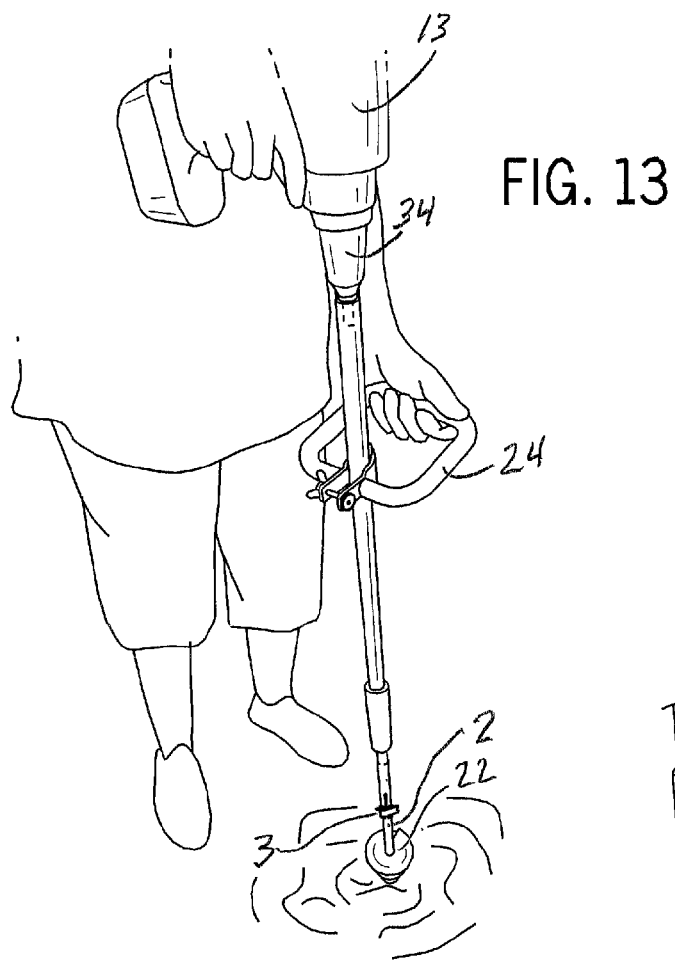
FIG. 13
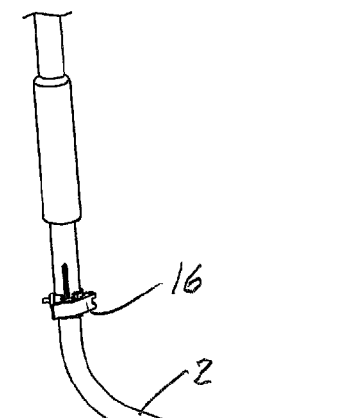
FIG. 14
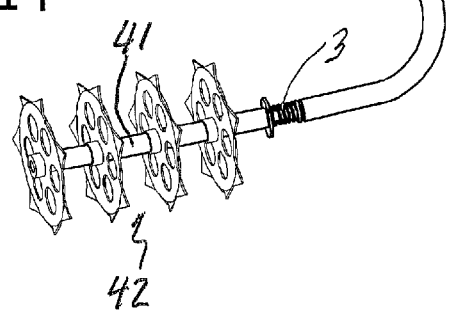

OUTDOOR MULTI-USE HAND TOOL

CROSS-REFERENCE TO RELATED APPLICATION

This application claims the benefit and incorporates the subject matter of U.S. Provisional Application No. 61/861,741 filed Aug. 2, 2013 and 61/915,201 filed Dec. 12, 2013.

BACKGROUND

A multi-use, powered hand tool that can selectively use any of a number of tools for outdoor functions would be very useful and could obviate the need for separate single-use tools.

SUMMARY

The present invention relates to an electrically driven hand tool that is adapted to use interchangeable tools that provide a number of very useful functions for home gardening, outdoor brushing and cleaning, garden tilling, auguring, and auto finishing and polishing.

The parts of the multi-function tool are made from stainless steel, brass, aluminum, and other non-corroding metals, and plastics. Each of the tools is mounted on an electrically driven rotary shaft powered by a conventional drill head providing rotation in opposite directions. The utilization of a drill head, besides the reversible action, provides variable speed and clutchable features that provide torque control.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings:

FIG. 2 is a perspective view of the tiller head, slightly enlarged with 1.

FIG. 3 is an end view of FIG. 2.

FIGS. 4 and 5 are partial sectional views showing the lower and upper positions of the adjustable shroud.

FIG. 13 is a perspective view of an operator using an S-shaft mounting for an auger.

FIG. 14 is a view of the S-shaped tabular version without utilizing a shroud.

DETAILED DESCRIPTION

Figures 15, 16:
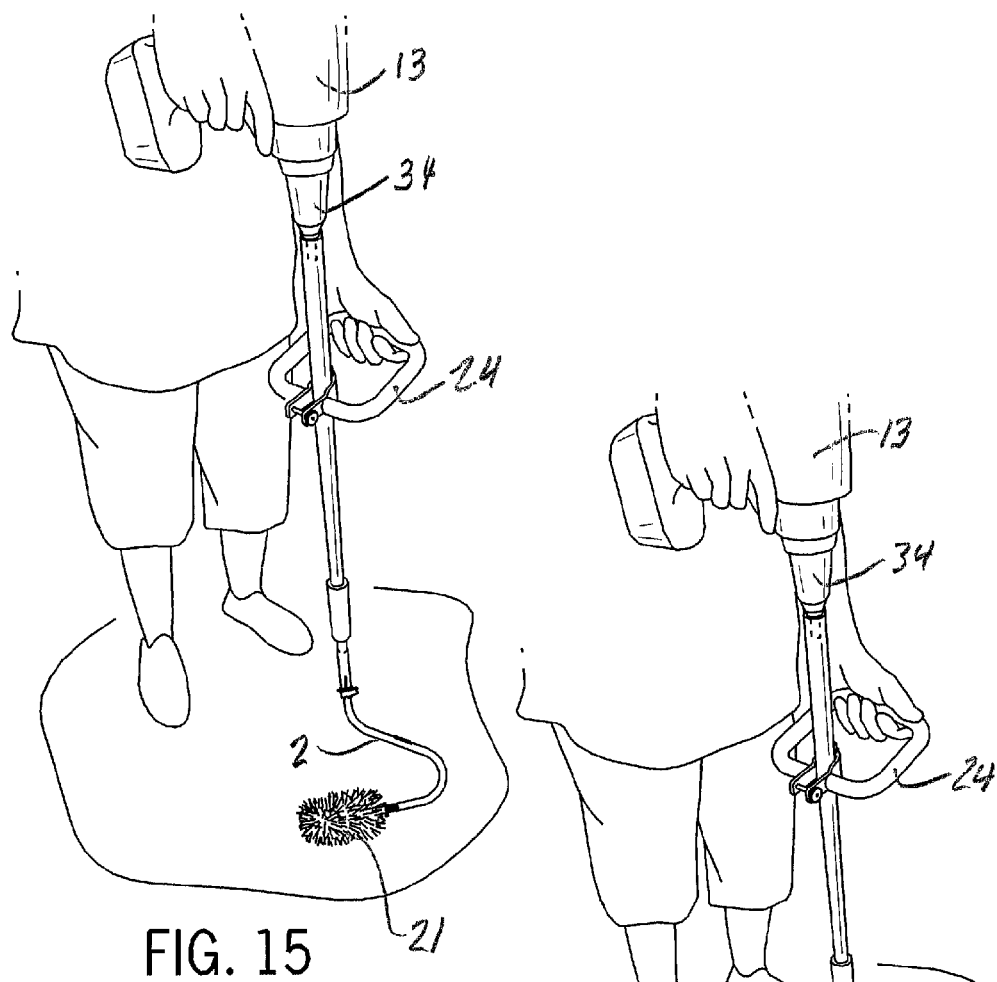
FIGS. 15 and 16 are views similar to FIG. 14 showing the use of the S-shaped drive tube with other rotary treatment and finishing tools.
Figure 17:
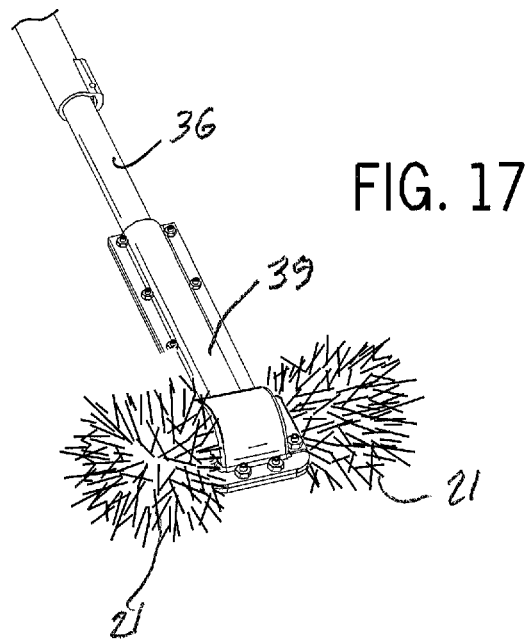
FIGS. 17 and 18 show the use of other rotary treatment tools utilized in the drive and support functions of the preferred embodiment.
Figure 18:
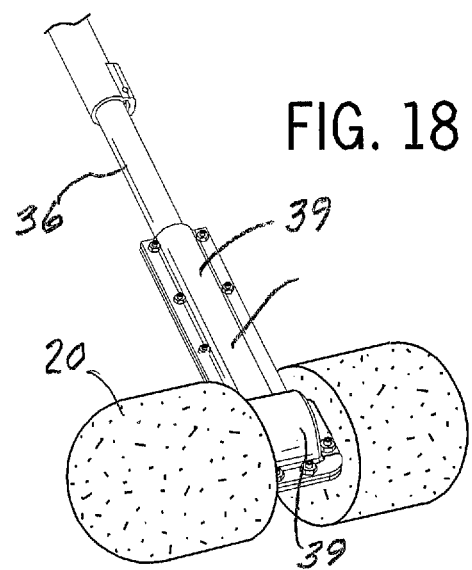

In FIGS. 13 and 14, there is shown a multi-use tool of the present invention comprising a rotary ground tiller 1. A demountable connector 3 at the lower end of an S-shaped drive tube 2 carries a flexible drive shaft 5, or optionally, directly to the S-shaped tube as best seen in FIGS. 14-16. The drive shaft extension 4 is connected to the lower S-shaped tube 2 with a connecting clamp 8, or other suitable connection. The tiller 1 includes a series of spaced tiller blades 9 welded to the tiller shaft 7 and formed with radially outer tilling teeth 10. The tiller blades 9 also include openings 11 in the titter body 12 to facilitate the movement of soil or other material being tilled. The tiller blades or other rotary tools (to be described below) may be partially covered by a demountable sheet metal shroud that will be described in detail with request to the preferred embodiment. The shroud helps prevent any undesirable throwing of tilled material. In this embodiment, the shroud may be attached to the drive tube with a clamp arrangement making it easy to attach and remove.

FIG. 14 shows the S-shaped drive tube 2 connection to the drive shaft extension 4 using an over center shaft connection 16 or other connector. If the drive shaft extension 4 is not used, the S-shaped drive tube 2 receives its driving power directly from the drill head. If the extension shaft connection 16 is used, the drive shaft extension 4 comprises stationary tube 2 which connects at its lower end to the upper end of the flexible shaft 5 that extends through the outer S-shaped tube 19. In FIGS. 15 and 16, there is shown a rotary foam buffing or cleaning pad 20. The buffing pad is attached to the end of the S-shaped drive tube 2 using the same type of connector 3 used to attach the tiller. Similarly, a stiff bristled rotary brush 21 can be substitute and may include a shroud 14 as previously shown with respect to the tiller 1.

FIG. 13 shows an auger 22 attached with a connecting clamp 8 to an auger shaft 23. In this arrangement, the S-shaped tube and flexible drive shaft 2 are not used. An operator's handle 24 is attached to the drive shaft extension 4. This will be described in greater detail below.

Figure 6:
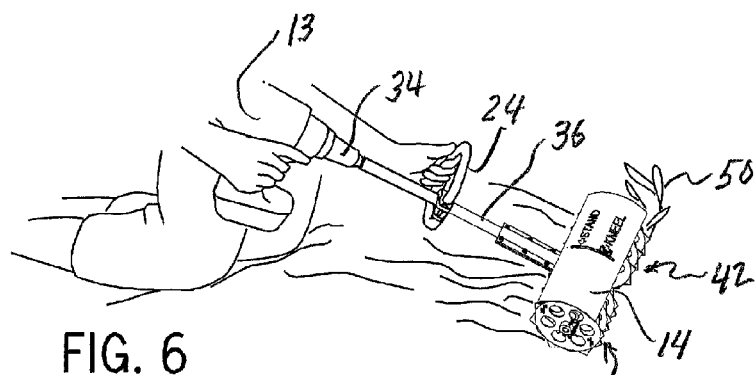
FIGS. 6-8 show other adjustable positions for the shroud particularly where plant damage is not an issue.
Figure 7:
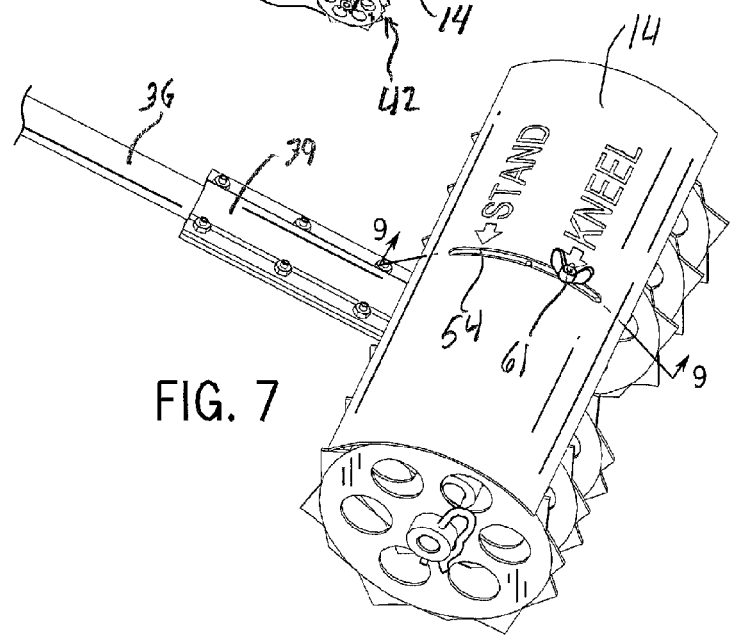
Figure 8:
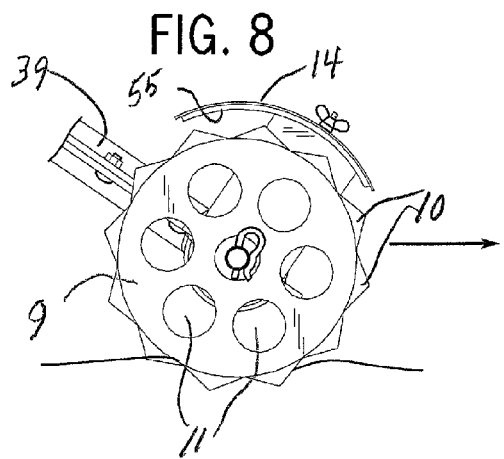
Figure 9:
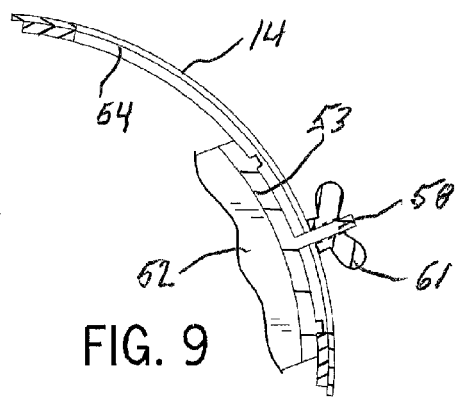
FIG. 9 is a partial sectional view similar to FIGS. 4 and 5 showing alternate shroud positioning.

In FIGS. 6 and 14, the connection of the handle 24 to the S-shaped drive tube 2 or to the drive shaft extension 4 as shown. If the drive shaft extension 4 is not used, the upper driven end 25 of the drive tube 2 and drive shaft extension 5 are connected directly to the power driver. If the shaft extension 4 is used, the upper driven end 25 of the S-shaped drive tube 2 is connected to the lower driven end 26 of the extension shaft 4. The handle 24 may be similar to a handle used with a yard grass trimmer or similar tool. Depending on whether the drive shaft extension 4 is used or not, the upper end of the S-shaped drive tube 2 may be provided with a key that is received in a keyway in a bore through the handle 24 through which the S-tube 2 or the drive shaft extension 4 extends.

Other rotary tools of many different kinds may be adapted for use with this driving system. In general, one group of rotary tools is connected to the drive tube to selectively carry a rotary tool on a coaxial mount with respect to the drive tube or a generally perpendicular mount with respect to the drive tube. The latter is shown in FIGS. 13 and 14 where the S-shaped drive tube ends in the indicated perpendicular mount. However, embodiments shown in FIGS. 1-12 are presently preferred.

Drawing FIGS. 1-12 show another and presently preferred embodiment of the invention that is particularly adapted to use as a garden tiller 30. The tiller receives driving power from a drill head 31 that is of conventional construction. The drill head includes a body housing an electric motor to which are attached a battery pack and a chucked connector 34, all of a conventional construction. Preferably, the chucked connector 34 is reversible, the motor provides variable speed and includes a clutch providing an adjustable output torque.

A drive shaft 35 is housed in a drive tube 36 and has one end of the shaft rotatably attached to the chucked connector 34. The opposite end of the drive shaft 35 carries a bearing 37 to rotatably support the drive shaft 35 in the end of the drive tube 36.

A bevel drive gear 38 is attached to the lower end of the drive shaft 35 and is supported in a T-shaped gear case 39 which carries a bevel driven gear 40 mounted on a cross shaft 41. The cross shaft 41 carries two identical tiller blade assemblies 42 each mounted on an end of the tiller cross shaft 41. Each end of the tiller shaft carries two or three tiller blade assemblies 42 and are held on the cross shaft 41 with cotter pins 51 or similar demountable connectors. The gears 38 and 40 provide a ratio suitable for the tilling task, but a large range of gear ratios may be acceptable. A first gear 38 to second gear 40 providing a 12:1 ratio may be acceptable.

Figure 10:
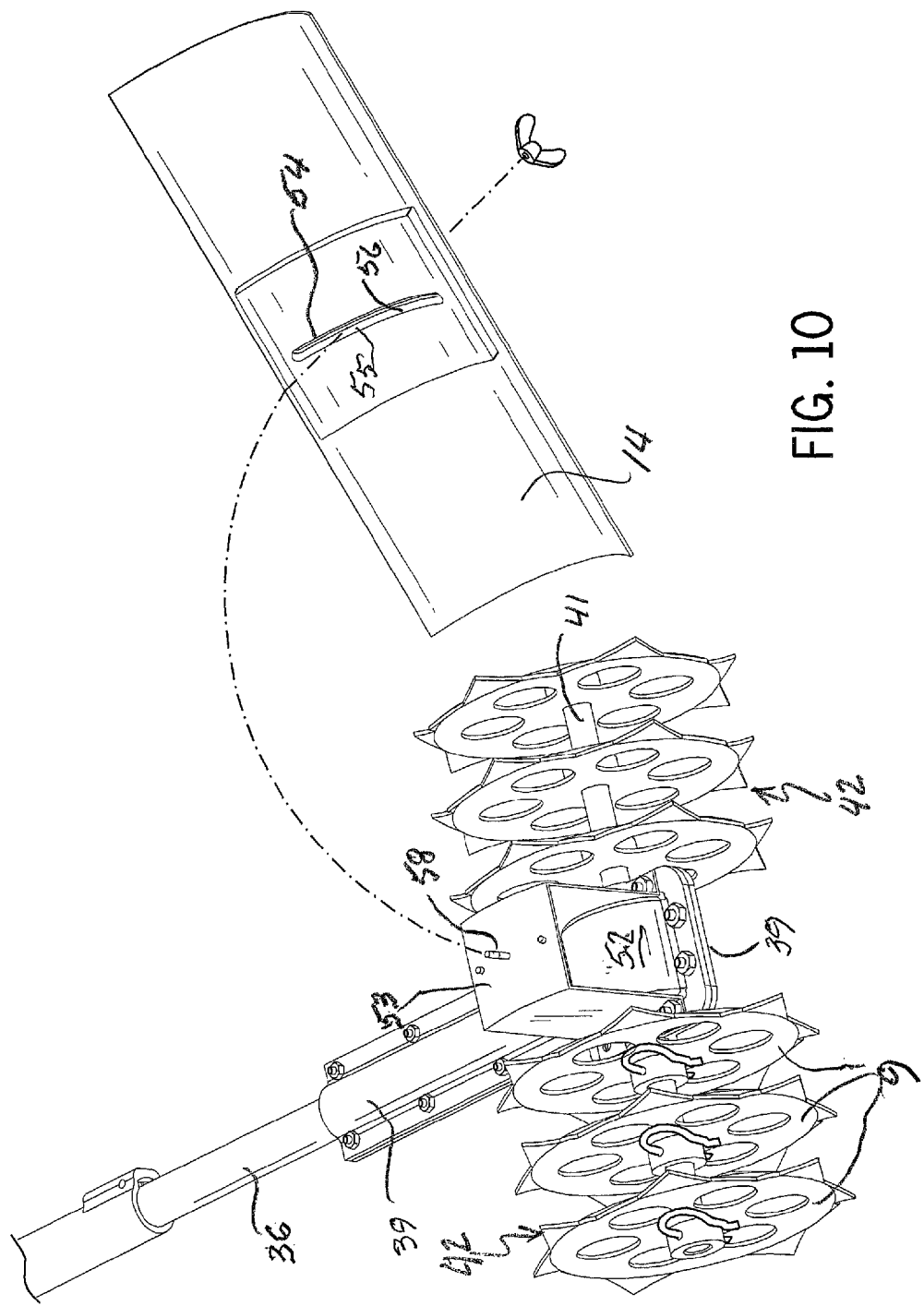
FIG. 10 is a partially exploded view of the tiller of the subject invention showing the manner in which the shroud is attached to the tiller gear case.
Figure 11:
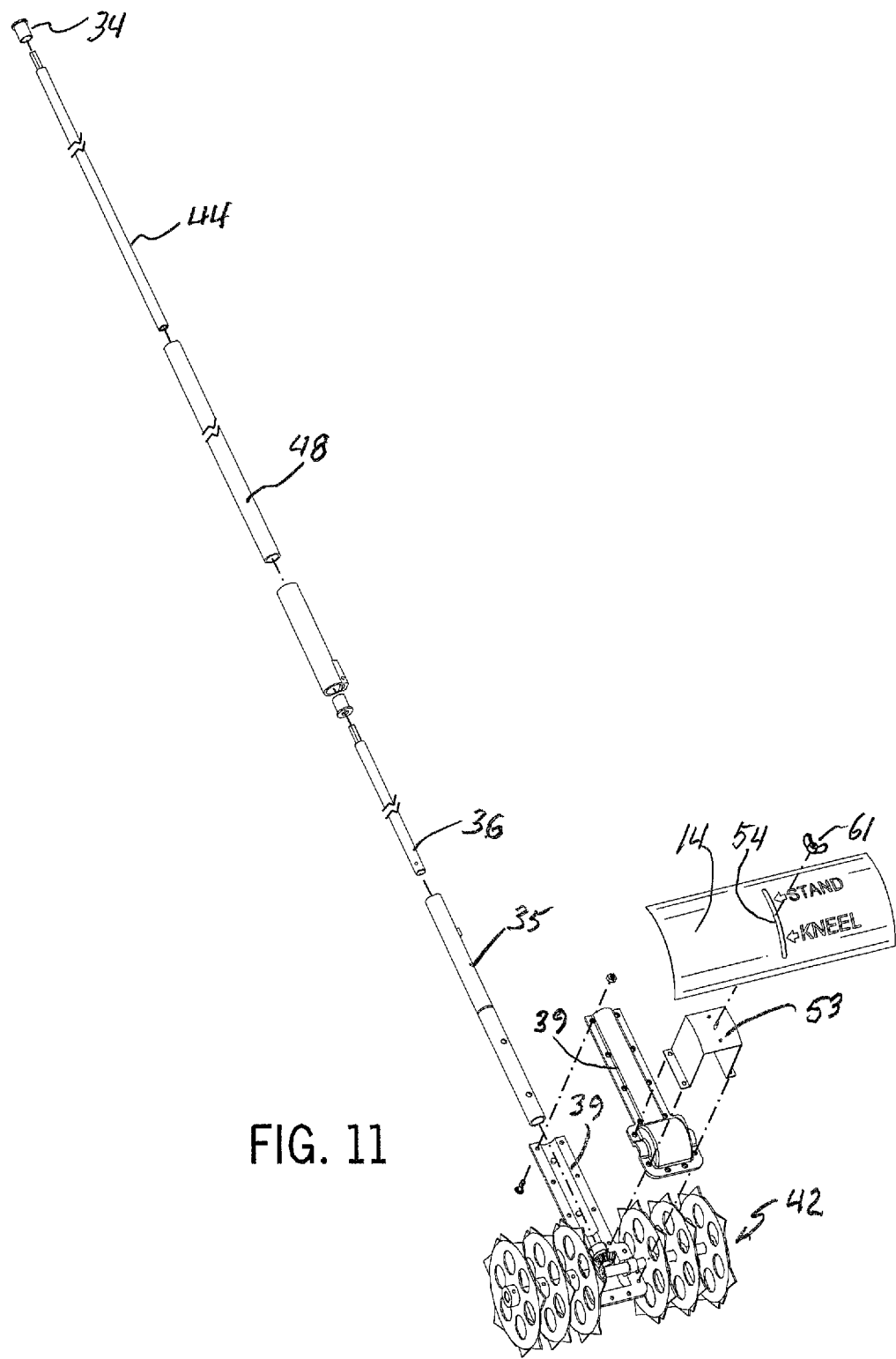
FIG. 11 is a full exploded view of the tiller of the present invention, including shaft extensions for maximum handle elongation.

The tiller 30 of this embodiment has a shortened drive shaft/drive tube 35/36, as shown in FIGS. 10 and 11, but may include a drive shaft extension 44 similar to the extension 4 used in the initially described embodiment. An adjustably positioned handle 45, the same as or similar to the handle 24 previously described, is adjustable both rotationally and axially.

Referring also to FIG. 6, the tool may be shortened to facilitate use by a gardener kneeling on the ground. Shortening is accomplished by removing the drive shaft extension 44, including the interior rotary drive shaft. The shroud 14 may include indicia showing the user where to set the shroud position with the words STAND or KNEEL as shown. Of course, this shortened version can also be modified by removing a number of tiller blades 9.

A significant feature of the present invention is the protective shroud 14 that partially surrounds the slitter blades 9 and, as indicated previously, the blade comprises two blade assemblies 42 that mount three blades on each end of the tiller cross shaft 41.

Figure 12:
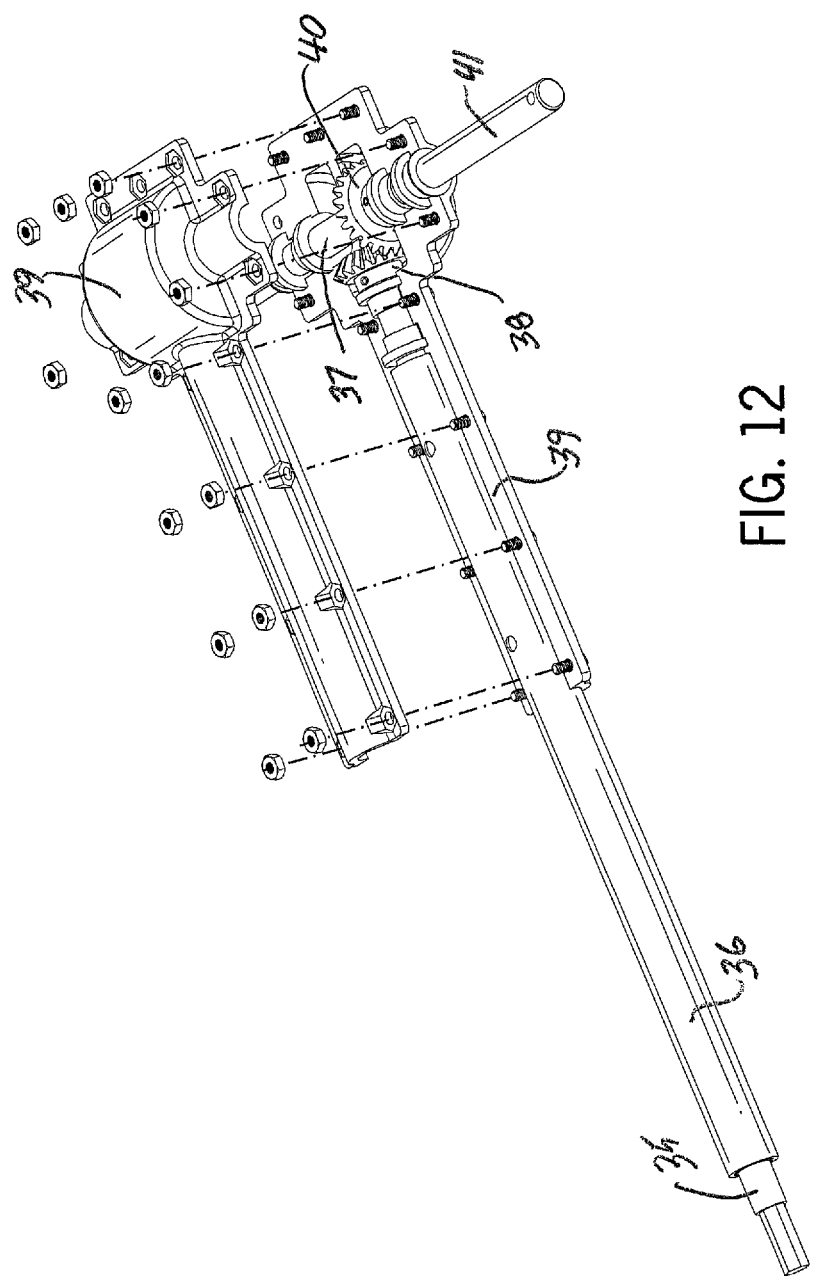
FIG. 12 is a partially exploded view of the apparatus in which the shroud and tiller blades have been removed to show the internal parts of the gear case.

Referring briefly to FIGS. 10-12, and in particular. FIG. 11, the assembly of the preferred embodiment of the invention is shown in the exploded view. The tiller blade assemblies 42 are carried on cross shaft 41 and also carries the driven gear 40, all enclosed in the T-shaped gear case 39, as described in greater detail above.

Figure 1:
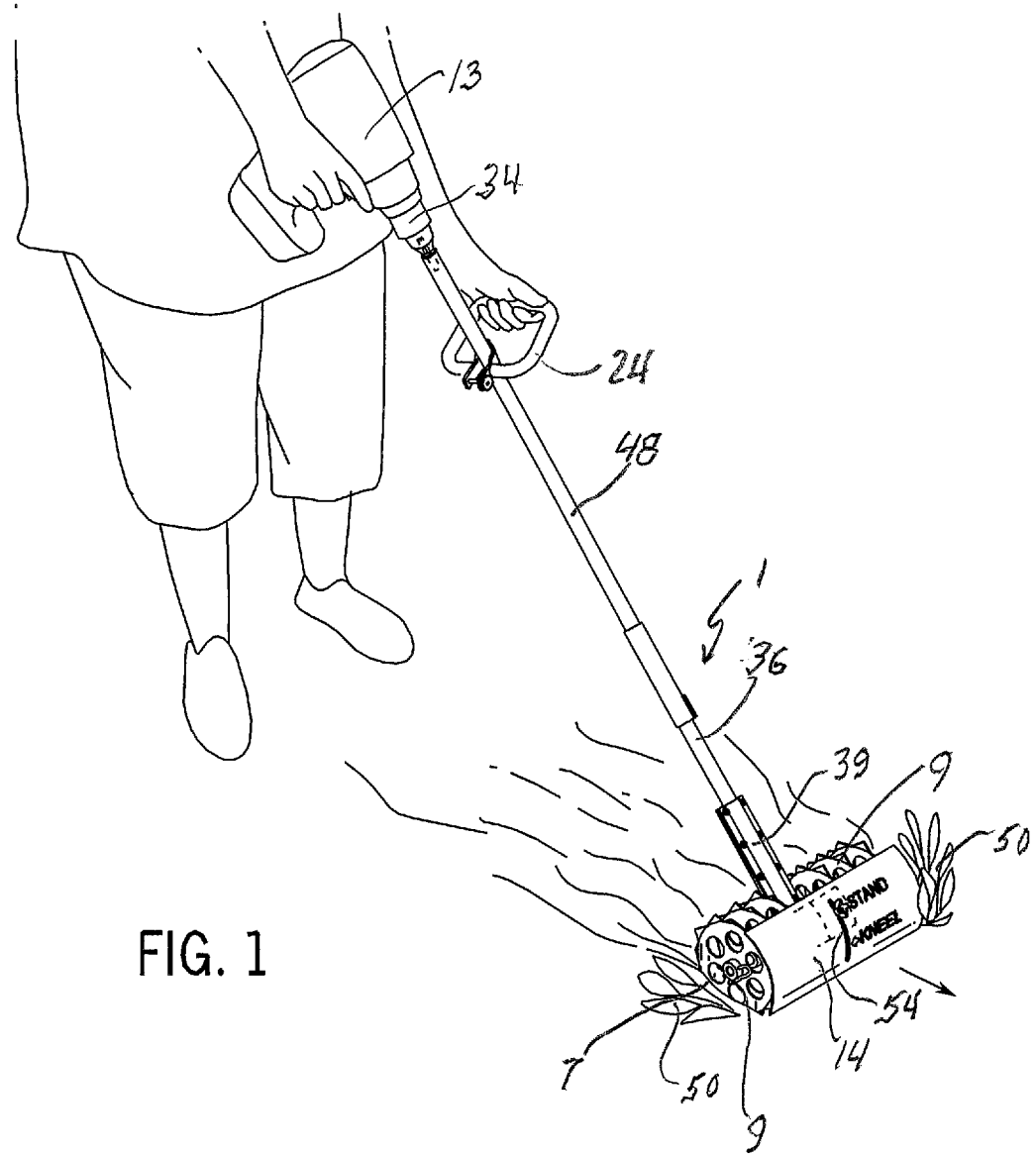
FIG. 1 is a perspective view of the tilling tool of the present invention with the handle fully extended and operated by a standing user.

The tiller blade assembly 42 as best shown in FIGS. 10 and 11 is the same as the blade assembly utilized in the embodiment of FIG. 14. The major differences are the elimination of the S-shaped drive tube 2 and the addition of the adjustable shroud 14 best shown in FIGS. 2-5 and 11. A generalized view of the tiller 1 in operation is shown in FIG. 1. Here, the tiller blade assemblies 42 are providing a tilling function under the control of an operator holding the drill head 31 in one hand to which is chucked the upper end of the drive shaft extension 44 that is housed in the drive tube extension 48. FIG. 1 also shows a unique feature of the tiller 30 which incorporates an adjustable and demountable shroud as discussed previously with respect to the shroud 14.

In FIG. 1, the operator can guide the tiller between rows of garden plants using the shroud 14 to push aside the plants so they are not chopped or otherwise damaged by rotating tiller blades 9. Because each of the tiller blades 9 is demountable from the cross shaft 41, the tiller may be set to operate with any desirable arrangement of blades, including only the blades on one end of the cross shaft 41 to navigate through narrower plant rows or by utilizing any of the blade assemblies.

As indicated above, important features of the invention, in addition to those already identified, include the use of plastic in the manufacture of the shroud 14. Indeed, a plastic shroud is presently more desirable than one made of aluminum or another metal. Utilizing a power driver, whether with a rechargeable battery or a power cord, provides very quiet operation at any selected speed. The control speed, low torque, and reversibility of the tool of the present invention, particularly utilization as a soil tiller, provides the user with the ability to make use of certain unique features not found in any hand operated garden tiller. For example, in tilling into the soil, there is always the concern with potential damage to underground wires. This can be at least partially ameliorated by operating the tiller at low speed and low torque to minimize damage. The tiller may also be reversed, in the event of engagement of underground wires or the like, to assist in untangling the wires. Other features, such as protection of garden plants and the like have already been discussed above.

To facilitate operation of the tiller of the preferred embodiment when operating fully extended, as shown in FIG. 1, the shroud 14 can be adjusted to suit the user's height. Furthermore, if the user prefers to do tilling on one's knees, only the shorter drive tube 36 and corresponding drive shaft 35 are used, as shown in FIG. 6. In FIG. 1, as the operator's position is adjusted downwardly corresponding to the height of a shorter user, the shroud may be repositioned as desired. Thus, the shroud may be positioned at an optimum operating position regardless of the user's height or hand positions with respect to the surface being worked.

The shroud 14 is supported on the T-shaped gear case 34 to partially overlie the cross shaft 41 and the tiller blade assemblies 42. The shroud is made of a rigid, semi-cylindrical sheet that is formed to provide a concave sleeve covering an upper portion of the blade assemblies. A raised upper gear case surface 52 includes a curved upper surface 53 having a curvature that matches that of the underside of the shroud and supports the same for movement. A supporting track 55 permits movement generally on the axis of the semi-cylindrical sheet forming the shroud such that the position of the shroud with respect to the blades can be adjusted. The track 55 includes a semi-circumferential slot 54, the edges of the slot dividing the track into parallel track runs 56, each run carrying a strip of a solid bearing material 57 that is positioned to engage and to be supported by the upper gear case surface. Threaded stud 58 extends upwardly from the upper gear case surface 60 where it is received in the slot 54 and fastened in place with an upper fastener 61. Movement of the shroud with respect to the stud 58 permits the shroud 14 to be adjustably positioned on the semi-cylindrical path, permitting either adjustment of the shroud to accommodate the physical characteristics of the user or to provide the previously described function of clearing plants from the path of tiller blades 9. These features are shown in FIGS. 1 and 6, as well as FIGS. 4, 5 and 9. The ends of the track 55 are provided with guide stops 62 that ride in the slot 54 to limit movement of the shroud and guide the shroud as it tracks in either direction.

I claim:

1. A multi-function rotary surface treating tool comprising:
   a drive tube carrying a rotatable drive shaft having an upper connection removably coupled to a rotary driver and a lower connection coupled to a tiller;
   the lower connection adapted to selectively carry the tiller on a perpendicular mount with respect to the drive tube;
   an adjustable shroud supported on a raised upper surface of a T-shaped gear case and positionable in a plurality of operating positions;
   a drive shaft extension tube carrying a drive shaft extension disposed between the upper connection of the drive shaft and the rotary driver, the drive shaft extension being removably coupled to the upper connection of the drive shaft and removably coupled to the rotary driver; and
   a connecting clamp removably coupling the drive tube extension and the drive tube
   wherein the tiller comprises a plurality of tiller blades, each having a flat circular plate body and a plurality of teeth circumferentially spaced around the flat circular plate body, an entirety of each tooth being angled with respect to the plate body;
   wherein the drive shaft includes:
      a first bevel gear rotatably supported on the lower end of the drive shaft and housed in a vertical leg of the T-shaped gear case; and
      a cross shaft housed in a horizontal leg of the T-shaped gear case, the cross shaft carrying a second bevel gear in driving engagement with the first bevel gear, the cross shaft extending through the T-shaped gear case and having respective opposite outer ends carrying the tiller blades;
   wherein the tiller blades are axially spaced along the cross shaft and each tiller blade is removably attached to at least one of said outer ends of the cross shaft via a respective one of a plurality of demountable connectors;
   wherein each flat circular plate body includes a plurality of pass-through holes configured to allow material to pass through each tiller blade during operation of the tool; and
   wherein the adjustable shroud includes:
      a rigid semi-cylindrical sheet forming a concave sleeve covering an upper portion of the tiller blades;
      a track formed as a semi-cylindrical slot in the rigid semi-cylindrical sheet, the track configured to permit movement on the axis of the rigid semi-cylindrical sheet to adjust the position of the adjustable shroud with respect to the tiller blades; and
      wherein the raised upper surface of the T-shaped gear case includes a threaded studs extending upwardly therefrom and through the semi-cylindrical slot, the threaded stud being configured to interfit with an adjustable fastener to position and fix the shroud on the raised upper surface of the T-shaped gear case.

2. The tool as set forth in claim 1 wherein the rotary driver provides the tiller blades with variable speed, variable torque, and reversibility.

3. The tool as set forth in claim 1 wherein the tiller blades are individually adjustable along a length of the cross shaft.

4. The tool as set forth in claim 1 wherein each tooth is oppositely angled with respect to an adjacent tooth.

5. The tool as set forth in claim 1 including an operator handle attached to at least one of the drive tube and the drive extension tube to enable engagement of the surface being worked with the cross shaft positioned horizontally or vertically.

6. The tool as set forth in claim 1 wherein the shroud is adjustable between a designated stand position and a designated kneel position to suit a plurality of operating positions for a user.

7. The tool as set forth in claim 1 wherein edges of the semi-cylindrical slot divide the track into parallel track runs, each run positioned to engage and be supported on the raised upper surface of the T-shaped gear case.

8. The tool as set forth in claim 1 wherein each flat circular plate body includes a hub disposed only on a first side of the flat circular plate body, and wherein the hub interacts with a respective one of the plurality of demountable connectors to attach the respective tiller blade to the cross shaft.

9. The tool as set forth in claim 1 wherein the adjustable shroud is coupled to the raised upper surface of the T-shaped gear case by way of the adjustable fastener.

10. The tool as set forth in claim 1 wherein the rotary driver is a handheld electrically-driven drill.

11. The tool as set forth in claim 6 wherein the shroud further comprises indicia on the rigid semi-cylindrical sheet adjacent the track to indicate at least one of the designated stand position and the designated kneel position.

12. The tool as set forth in claim 7 wherein the track further comprises guide stops within the semi-circumferential slot.

* * * * *